United States Patent
Lin (10) Patent No.: US 9,425,593 B2
(45) Date of Patent: Aug. 23, 2016

(54) STRIPPING TOOL

(71) Applicant: Hanlong Industrial Co., Ltd., New Taipei (TW)

(72) Inventor: Pai-Wei Lin, New Taipei (TW)

(73) Assignee: Hanlong Industrial Co., Ltd., New Taipei (TW)

(*) Notice: Subject to any disclaimer, the term of this patent is extended or adjusted under 35 U.S.C. 154(b) by 51 days.

(21) Appl. No.: 14/543,995

(22) Filed: Nov. 18, 2014

(65) Prior Publication Data

US 2016/0141849 A1 May 19, 2016

(51) Int. Cl.
*H02G 1/12* (2006.01)

(52) U.S. Cl.
CPC .................... *H02G 1/1224* (2013.01)

(58) Field of Classification Search
CPC .................................................. H02G 1/1224
See application file for complete search history.

(56) References Cited

U.S. PATENT DOCUMENTS

| | | | | |
|---|---|---|---|---|
| 843,353 A | * | 2/1907 | McKenna | H02G 1/1224 30/90.1 |
| 4,179,956 A | * | 12/1979 | Gooley | H02G 1/1224 30/90.8 |
| 4,640,009 A | | 2/1987 | Liversidge | |
| 4,805,302 A | * | 2/1989 | Steiner | H02G 1/1224 30/90.1 |
| 5,398,413 A | * | 3/1995 | Chen | H02G 1/1224 30/90.1 |
| 5,555,624 A | * | 9/1996 | McCracken | B26B 29/06 30/2 |
| 7,003,883 B2 | * | 2/2006 | Tapper | H02G 1/1224 30/109 |
| 8,733,212 B2 | * | 5/2014 | Liu | B25F 1/02 7/107 |
| 2003/0188432 A1 | * | 10/2003 | Temple | H02G 1/1229 30/90.6 |
| 2011/0056026 A1 | * | 3/2011 | Lin | H01R 43/042 7/107 |

* cited by examiner

*Primary Examiner* — Hwei C Payer
(74) *Attorney, Agent, or Firm* — Alan D. Kamrath; Kamrath IP Lawfirm, P.A.

(57) ABSTRACT

A stripping tool includes a body, an exchangeable tool holder, a first blade, a fixing member, and an elastic element. The exchangeable tool holder is disposed in the hole. The exchangeable tool holder has a first side disposed with a first recess. The first blade is connected with the exchangeable tool holder, and the first blade has at least one portion protruded out of the first recess. The fixing member is movably disposed in the body and includes a recess portion and a pressing end. The recess portion is located in the hole to correspond to the first recess and to form an opening along with the first recess, and the pressing end is provided for the user to move the fixing member to adjust the aperture of the opening. The elastic element is connected with the fixing member to provide an elastic force to the fixing member.

11 Claims, 8 Drawing Sheets

STRIPPING TOOL

BACKGROUND OF THE INVENTION

1. Field of the Invention

The present invention relates to a stripping tool and, more particularly, to a stripping tool which can easily remove outer layers of a coaxial cable.

2. Description of the Related Art

Coaxial cables are widely used for signal transmissions. In general, a coaxial cable comprises a copper wire in the center and wrapped in two outer layers. When it is necessary to electrically connect the coaxial cable to an electrical appliance/equipment, the outer layers of the coaxial cable have to be stripped by using a stripping tool to expose the copper wire in the center.

In a prior art technique, U.S. Pat. No. 4,640,009, entitled "Co-axial cable stripping tool and end portion preparation method", discloses a prior art stripping tool. The blade is fixedly connected with the body and is not easy to replace (it is necessary to disassemble the body to replace the blade). Furthermore, the prior art stripping tool adjusts the opening by pulling the fixing member to separate the fixing member from the body, making it inconvenient and laborious for a user to perform the operation.

Therefore, it is necessary to propose a new stripping tool to overcome the deficiencies of the traditional stripping tools.

SUMMARY OF THE INVENTION

It is an object of the present invention to provide a stripping tool which makes it easy to strip the outer layer of the cable.

In order to achieve the above object, the present invention provides a stripping tool for a user to easily remove at least one outer layer of a cable. The stripping tool comprises a body, an exchangeable tool holder, at least one first blade, a fixing member, and an elastic element. The exchangeable tool holder is disposed in the hole, and the exchangeable tool holder has a first side disposed with a first recess. The first blade is connected with the exchangeable tool holder and has at least one portion protruded out of the first recess. The fixing member is movably disposed in the body and comprises a recess portion and a pressing end. The recess portion is located in the hole to correspond to the first recess and to form an opening along with the first recess. The pressing end is provided for the user to move the fixing member to adjust the size of the opening. The elastic element is connected with the fixing member to provide an elastic force to the fixing member. The fixing member is driven by the elastic force to work with the first blade to hold the cable when the cable is placed in the opening, and the first blade removes the outer layer by rotation or movement of the body when the cable is fixedly held in the opening.

According to an embodiment of the present invention, the body further comprises a cavity for disposing the pressing end of the fixing member therein.

According to an embodiment of the present invention, the pressing end of the fixing member comprises an arc-shaped plane.

According to an embodiment of the present invention, the cavity comprises an inner wall having a concave surface corresponding to the arc-shaped plane to form a substantially circular through hole, which is provided for the user to rotate the body.

According to an embodiment of the present invention, the stripping tool further comprises at least one second blade, and the exchangeable tool holder further comprises a second side disposed with a second recess. The at least one second blade is connected with the exchangeable tool holder, and the at least one second blade has at least one portion protruded out of the second recess.

According to an embodiment of the present invention, the first recess has a dented depth different from that of the second recess.

According to an embodiment of the present invention, two side walls of the hole are disposed with a concave track respectively. The exchangeable tool holder further comprises a third side and a fourth side corresponding to the third side. The third side and the fourth side are respectively disposed with a bump for engaging with each one of the two concave tracks respectively, thereby allowing the exchangeable tool holder to be detachably connected with the body.

According to an embodiment of the present invention, the stripping tool further comprises a Velcro hook and loop strip connected with the body.

According to an embodiment of the present invention, the stripping tool further comprises a retaining element connected with the exchangeable tool holder. The retaining element stops one end of the cable when the one end of the cable goes through the opening and reaches the retaining element, thereby allowing the user to rotate the body to remove a fixed length of the outer layer.

According to an embodiment of the present invention, the exchangeable tool holder is detachably connected with the body.

According to an embodiment of the present invention, the exchangeable tool holder is detachably connected with the fixing member.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENT

Figure 1:
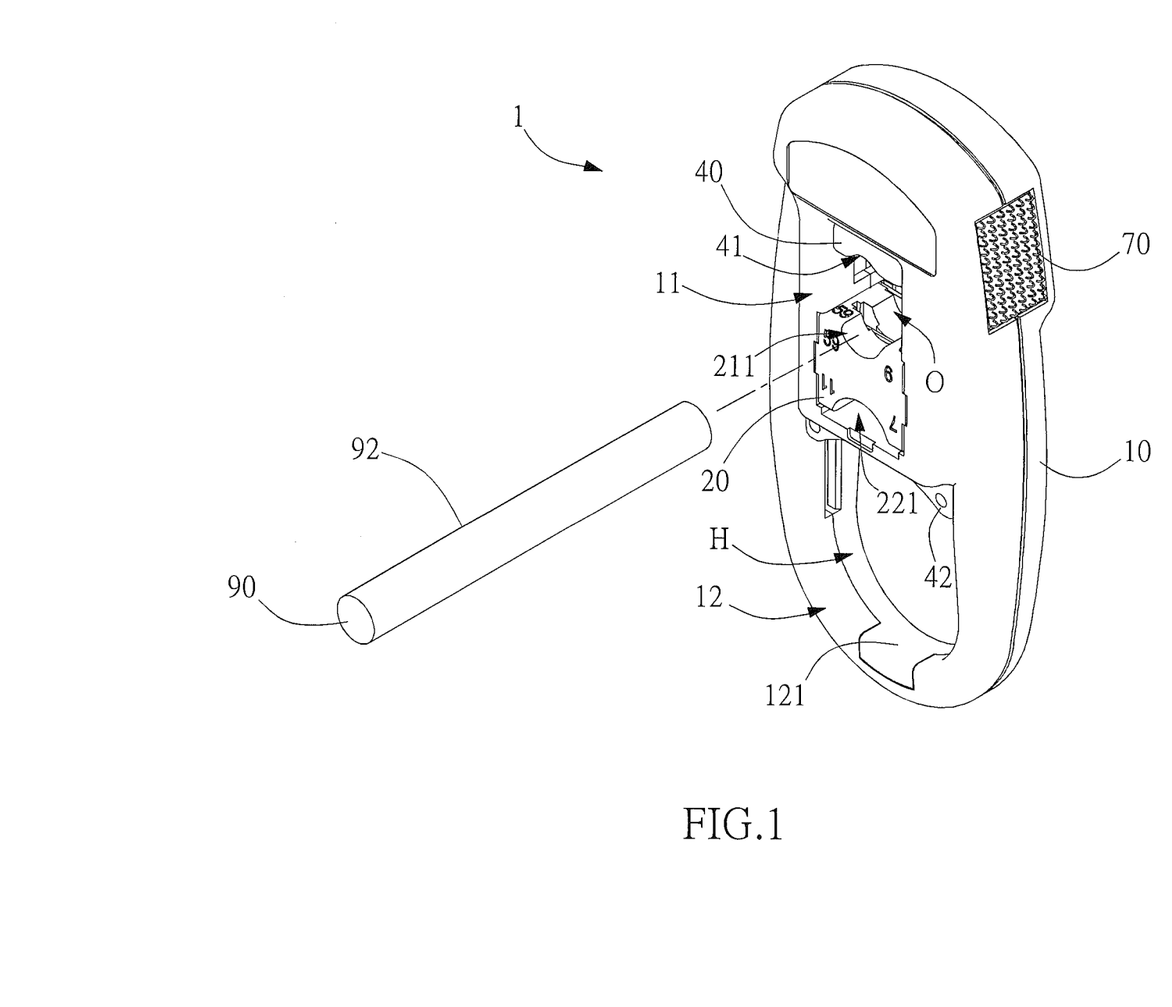
FIG. 1 illustrates a side view of a stripping tool of the present invention.
Figure 2:
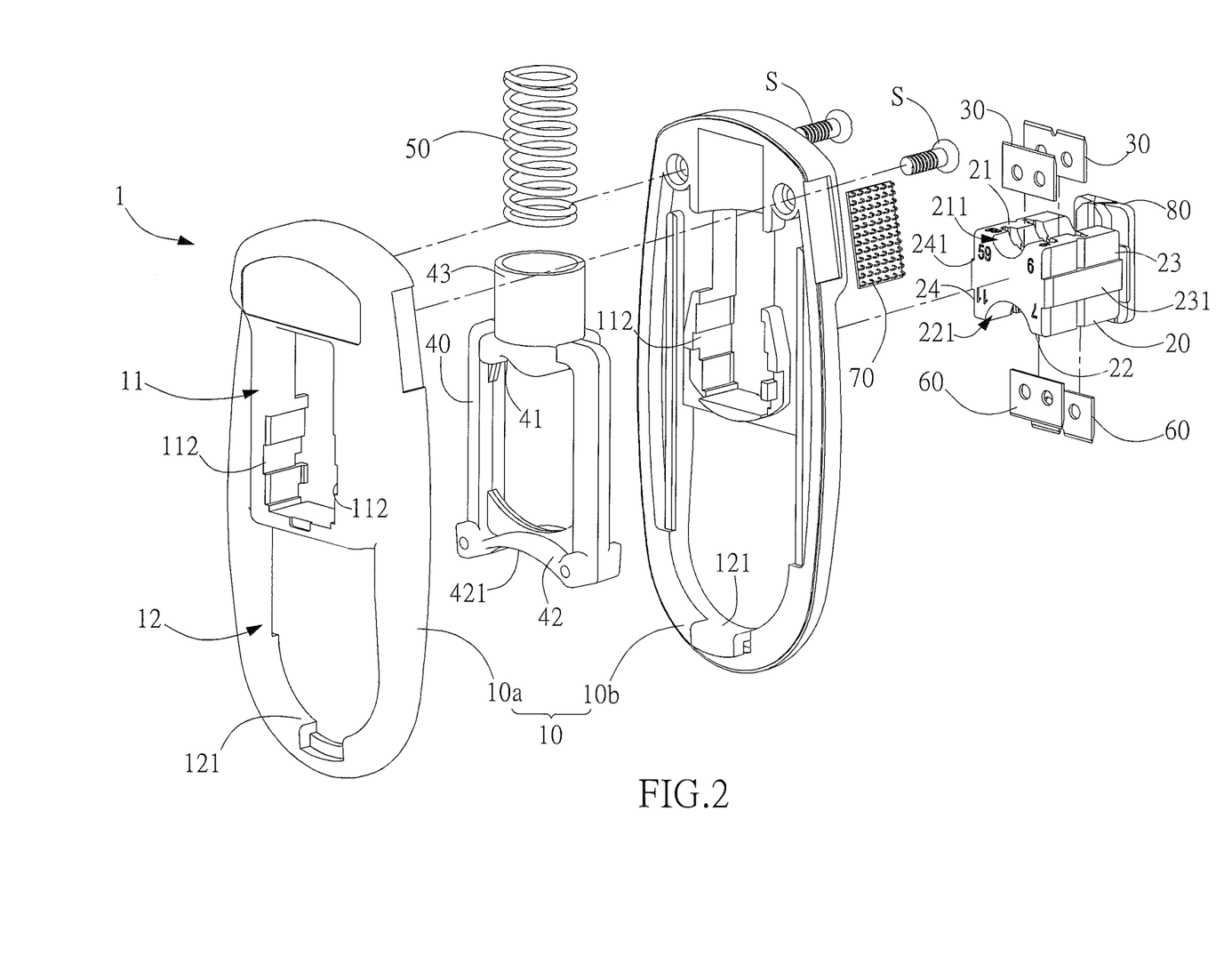
FIG. 2 illustrates an exploded view of the stripping tool of the present invention.
Figure 7:
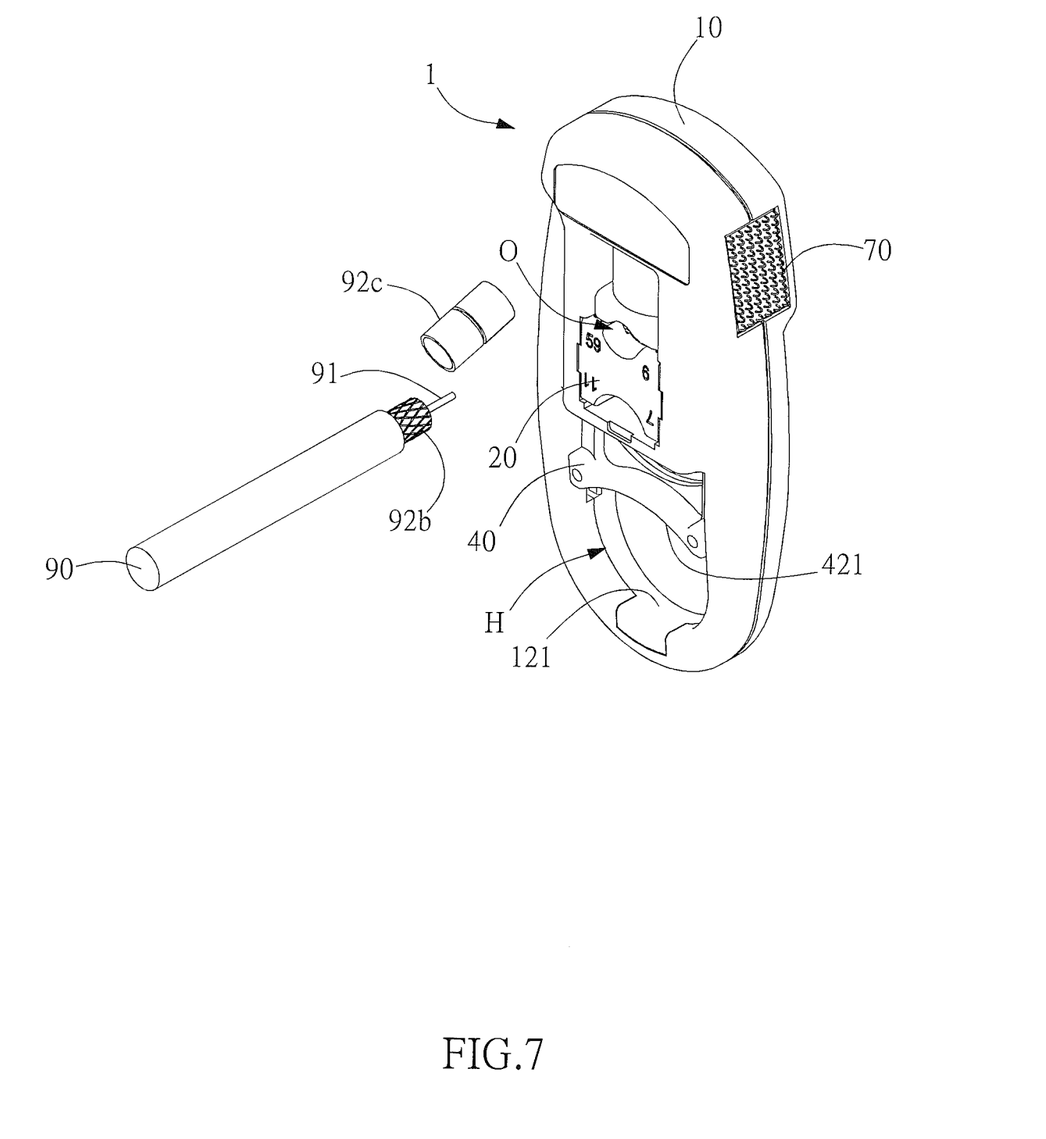
FIG. 7 illustrates a view of the cable after the outer layer is removed by rotating the cable.
Figure 8:
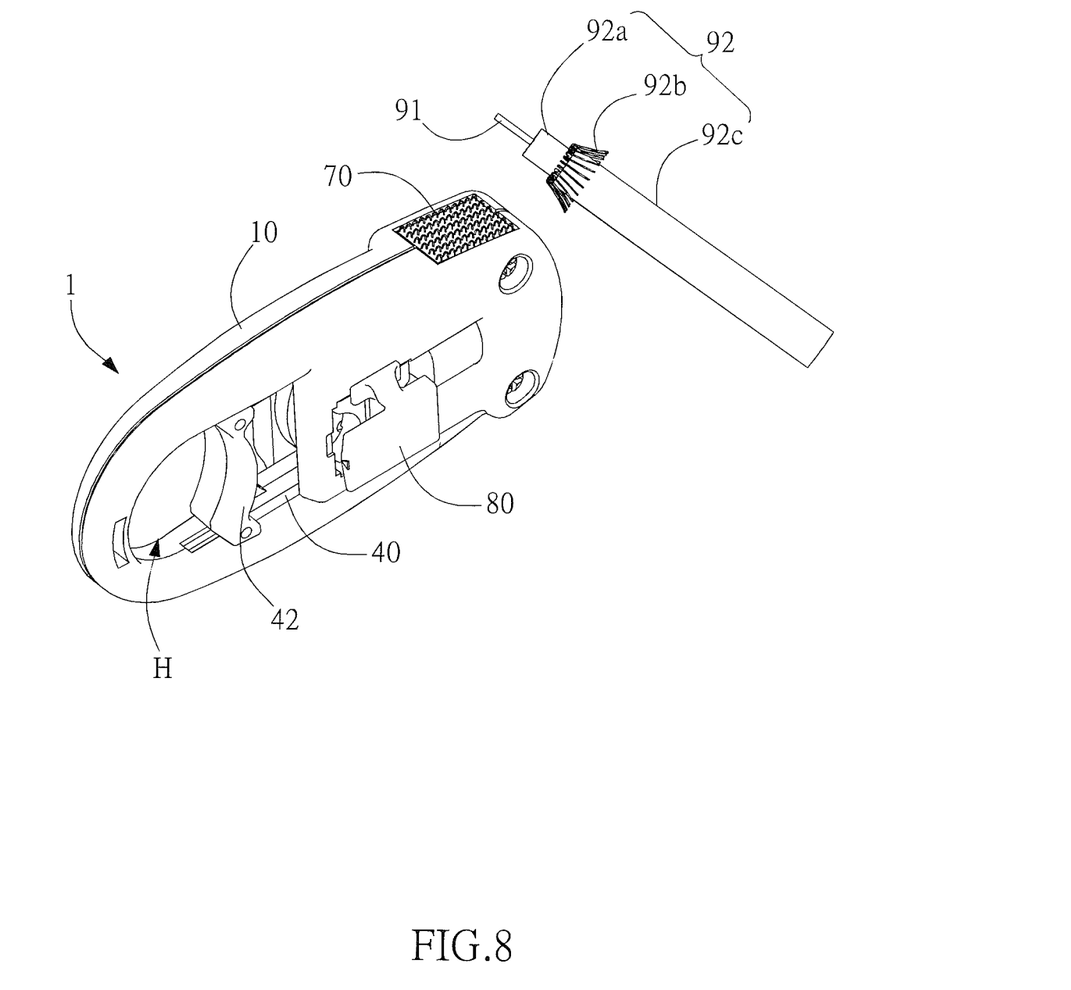
FIG. 8 illustrates a view using a Velcro hook and loop strip to separate one of the outer layers of the cable.

Please refer to FIG. 1 and FIG. 2, and also to FIG. 7 and FIG. 8. FIG. 1 illustrates a side view of a stripping tool of the present invention; FIG. 2 illustrates an exploded view of the stripping tool of the present invention; FIG. 7 illustrates a view of the cable after the outer layer is removed by rotating the cable; and FIG. 8 illustrates a view using a Velcro hook and loop strip to separate one of the outer layers of the cable.

As shown in FIG. 1 and FIG. 2, the stripping tool 1 of the present invention is provided for a user to quickly remove at least one outer layer 92 of a cable 90. As shown in FIG. 7 and FIG. 8, in an embodiment of the present invention, the cable 90 is a coaxial cable comprising a central conductor 91 and three outer layers 92. The three outer layers 92 are an insulating layer 92a, a braid shield 92b, and a protecting layer 92c, illustrated from the center outward. However, the cable 90 can be any other kind of cable or insulated wire which can be stripped by the stripping tool 1.

As shown in FIG. 1 and FIG. 2, in an embodiment of the present invention, the stripping tool 1 comprises a body 10, an exchangeable tool holder 20, two first blades 30, a fixing member 40, an elastic element 50, two second blades 60, a Velcro hook and loop strip 70, and a retaining element 80.

In an embodiment of the present invention, the body 10 is formed by locking a front cover 10a and a back cover 10b with the bolt S. The body 10 comprises a hole 11 and a cavity 12. Two sides of the hole 11 are disposed with a concave track 112 respectively, while the cavity 12 comprises an inner wall having a concave surface 121.

In an embodiment of the present invention, the exchangeable tool holder 20 comprises a first side 21, a second side 22, a third side 23, and a fourth side 24. The first side 21 corresponds to the second side 22, and the first side 21 and the second side 22 are disposed with a first recess 211 and a second recess 221 respectively. In an embodiment of the present invention, the first recess 211 has a dented depth different from that of the second recess 221, but the first and second recesses can have other configurations. The third side 23 corresponds to the fourth side 24, and the third side 23 and the fourth side 24 are disposed with bumps 231, 241 respectively for engaging with each one of the concave tracks 112 respectively, thereby allowing the exchangeable tool holder 20 to be detachably connected with the hole 11 of the body 10. It is noted that although in this embodiment the exchangeable tool holder 20 is detachably connected with the hole 11 of the body 10, the exchangeable tool holder 20 can be connected with the hole 11 through the fixing member 40.

In an embodiment of the present invention, the two first blades 30 are connected with the exchangeable tool holder 20 respectively, and each one of the first blades 30 has at least one portion protruded out of the first recess 211. The lengths by which the two first blades 30 protrude out of the first recess 211 are different from each other.

In an embodiment of the present invention, the fixing member 40 is movably disposed in the body 10, and the fixing member 40 comprises a recess portion 41, a pressing end 42, and a receiving cylinder 43.

The recess portion 41 is disposed in the hole 11 and corresponds to the first recess 211, such that the recess portion 41 forms an opening O with the first recess 211. The pressing end 42 is disposed in the cavity 12, and the pressing end 42 is provided for the user to move the fixing member 40 to adjust the size of the opening O. The pressing end 42 comprises an arc-shaped plane 421 which corresponds to the inner wall of the concave surface 121 to form a substantially circular through hole H with the inner wall of the concave surface 121. The through hole H is provided for the user to easily rotate the body 10. The receiving cylinder 43 contains and fixes the elastic element 50.

In an embodiment of the present invention, the elastic element 50 is disposed in the receiving cylinder 43 and is connected with the fixing member 40. The elastic element 50 provides an elastic force to the fixing member 40, which is driven by the elastic force to work with the first blade 30 or the second blade 60 to hold the cable 90 when the cable 90 is placed in the opening O. In an embodiment of the present invention, the elastic element 50 can be a spring or any other element which can provide an elastic force.

In an embodiment of the present invention, the two second blades 60 are connected with the exchangeable tool holder 20, and each one of the second blades has at least one portion protruded out of the second recess 221. The lengths by which the two second blades 60 protrude are different from each other. When the exchangeable tool holder 20 is placed upside down into the hole 11 of the body 10, the second recess 221 can also form the opening O with the recess portion 41. Because the second recess 221 has a dented depth different from that of the first recess 211, the opening O formed by the second recess 221 and the recess portion 41 has an aperture different from that formed by the first recess 211 and the recess portion 41.

In an embodiment of the present invention, the Velcro hook and loop strip 70 is connected with the body 10 to be on a side of the body 10, and the Velcro hook and loop strip 70 is provided for the user to separate a portion of the braid shield 92b from the insulating layer 92a to expose a portion of the insulating layer 92a (as shown in FIG. 8).

In an embodiment of the present invention, the retaining element 80 is connected with the exchangeable tool holder 20, and the retaining element 80 stops one end of the cable 90 when the one end of the cable 90 goes through the opening O and reaches the retaining element 80, thereby allowing the user to rotate the body 10 to remove a fixed length of the at least one outer layer 92.

Now please refer to FIG. 3A to FIG. 8 for the practical use of the stripping tool of the present invention.

Figure 3A:
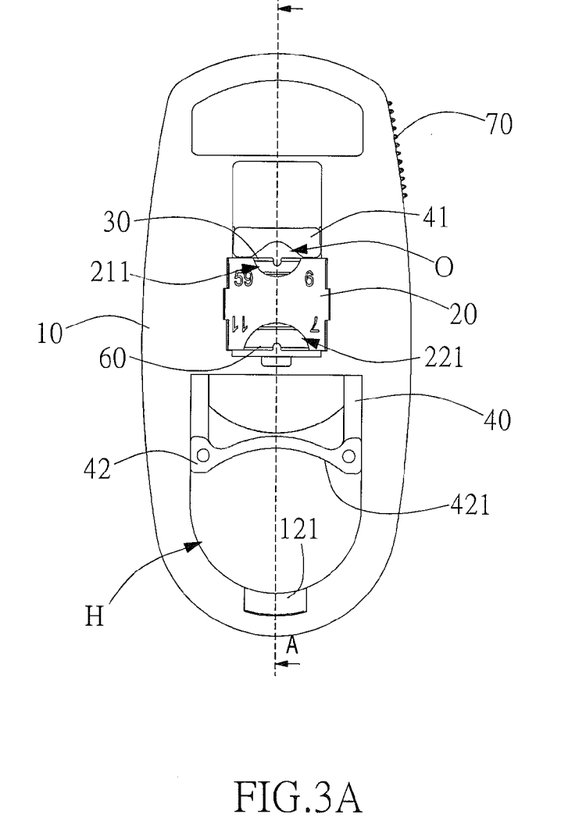
FIG. 3A illustrates a front view of a fixing member of the stripping tool before being pushed.
Figure 3B:
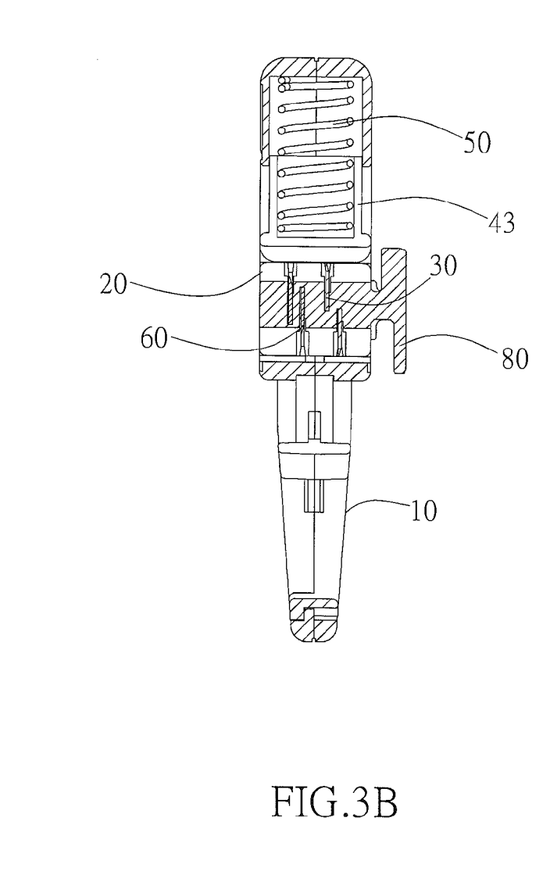
FIG. 3B illustrates a cross-sectional view of the A-A line of FIG. 3A.

As shown in FIG. 3A and FIG. 3B, when the user does not push the fixing member 40 to move towards the elastic element 50, the recess portion 41 of the fixing member 40 forms an opening O having an area smaller than the cross-sectional area of the cable 90 with the first recess 211 or the second recess 221 of the exchangeable tool holder 20, depending on the placement of the exchangeable tool holder 20. Because the dented depths of the first recess 211 and the second recess 221 are different from each other, the user can use different recesses of the stripping tool 1 to strip cables having different diameters. It is noted that the dented depths of the first recess 211 and the second recess 221 of the exchangeable tool holder 20 of the stripping tool 1 can be the same. In this case, the second blade 60 acts as the spare part of the first blade 30. That is, they can be used to strip the outer layer 92 of cables 90 having the same diameter.

Figure 4A:
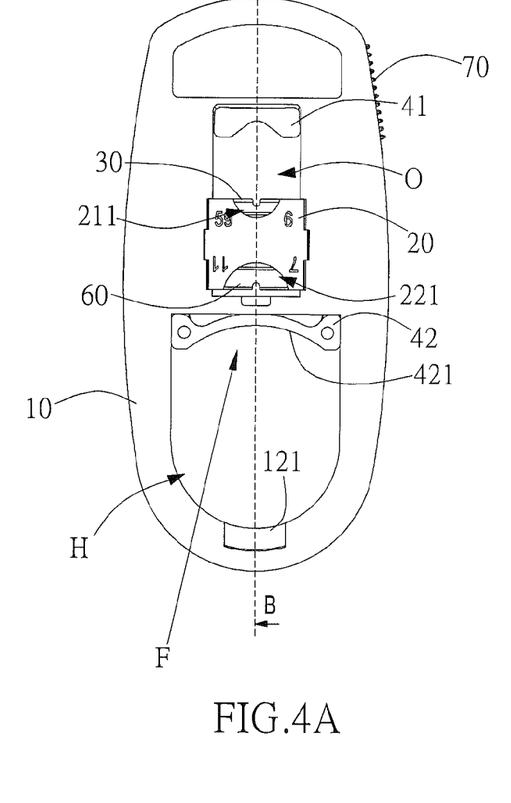
FIG. 4A illustrates a front view of the fixing member of the stripping tool after being pushed.
Figure 4B:
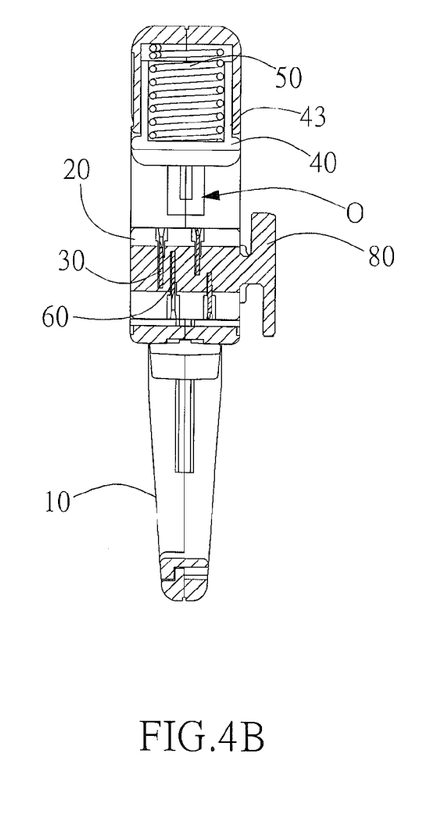
FIG. 4B illustrates a cross sectional view of the B-B line of FIG. 4A.
Figure 5A:
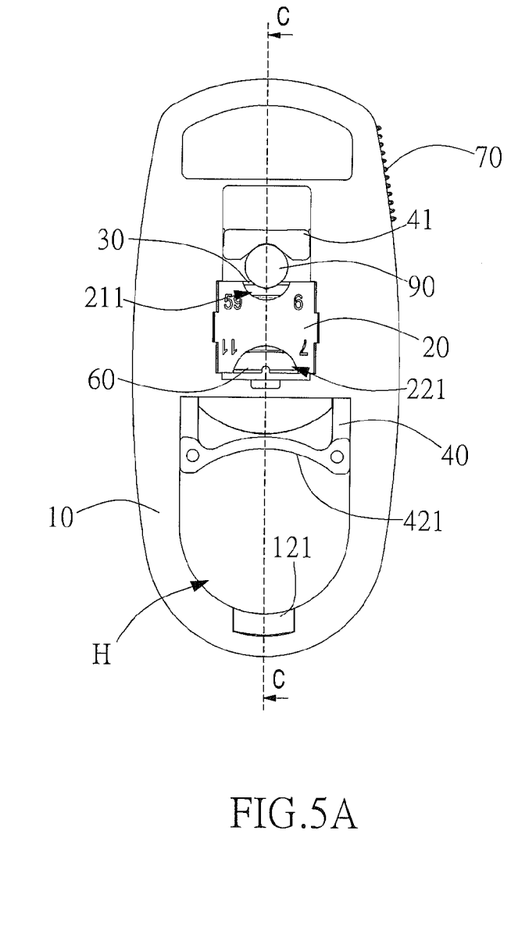
FIG. 5A illustrates a view of the cable going through the opening.
Figure 5B:
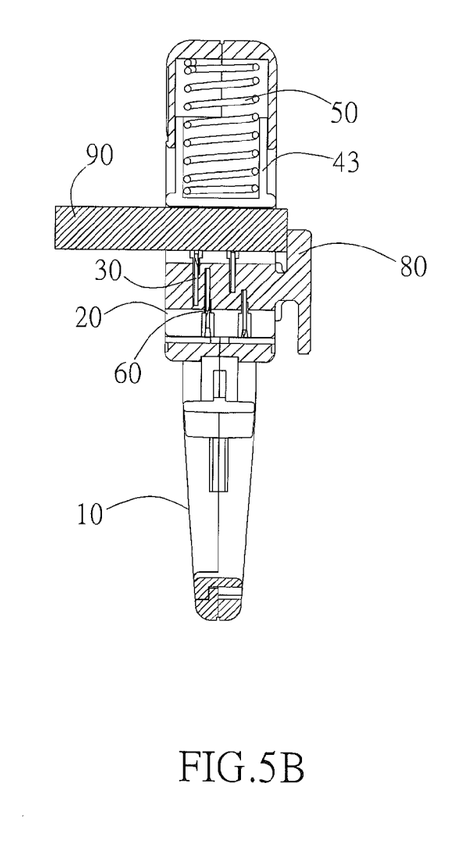
FIG. 5B illustrates a cross sectional view of the C-C line of FIG. 5A.
Figure 6:
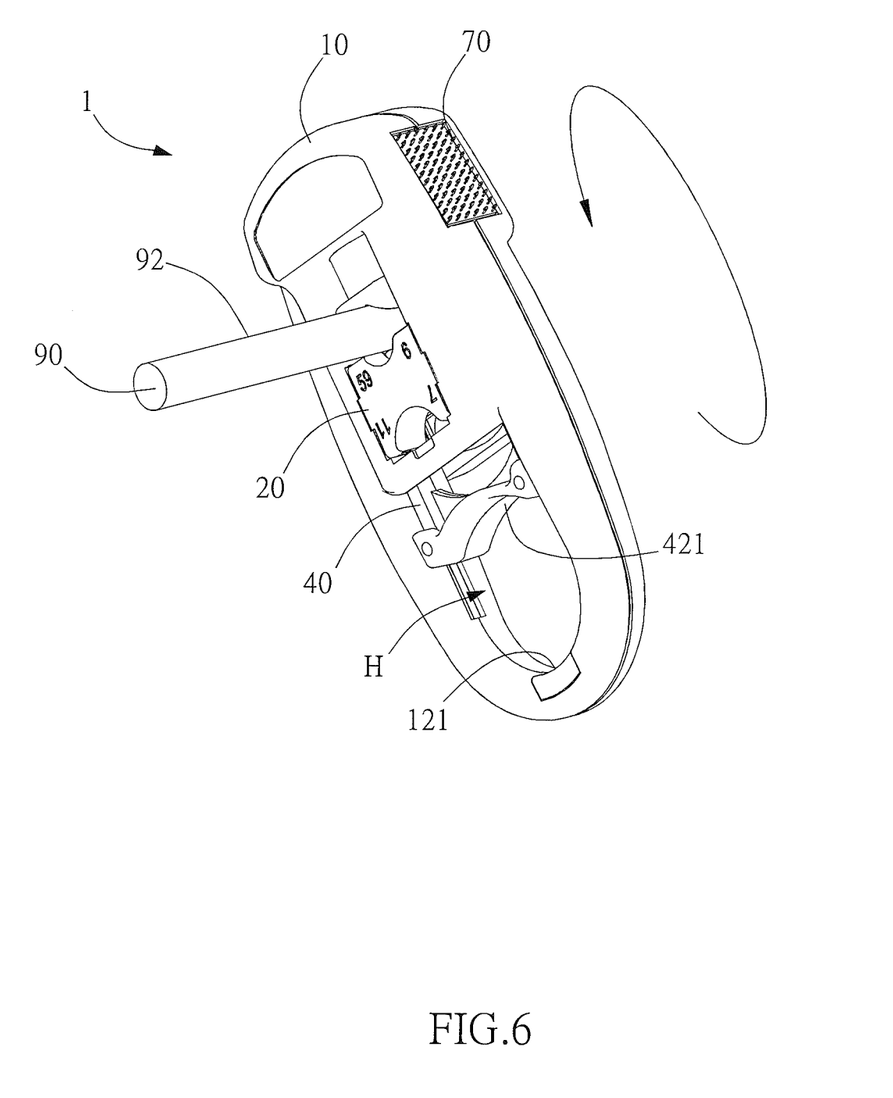
FIG. 6 illustrates a view of removing an outer layer of the cable by rotating the cable.

As shown in FIG. 4A and FIG. 4B, when the user pushes the fixing member 40 to move towards the elastic element 50 (as shown by the arrow F), the recess portion 41 of the fixing member 40 moves away from the first recess 211 (or the second recess 221) to form an opening O having a diameter larger than that of the diameter of the cable 90. At this time, the user can insert the cable 90 into the opening O. After the cable 90 is inserted into the opening O, the fixing member 40 is driven by the elastic force provided by the elastic element 50 to move back when the user stops pushing the fixing member 40, such that the cable 90 is held by the fixing member 40 and the first blade 30 (or the second blade 60), as shown in FIG. 5A and FIG. 5B. As the user rotates the body 10 of the stripping tool 1, as shown in FIG. 6, the first blade 30 (or the second blade 60) removes the outer layer 92 of the cable 90. At this time, since the two first blades 30 (or the two second blades 60) protrude different lengths out of the first recess 211 (or the second recess 221), the first blade 30 (or the second blade 60) having a longer protruded length out of the first recess 211 (or the second recess 221) will remove the whole outer layer 92, while the first blade 30 (or the second blade 60) having a shorter protruded length out of the first recess 211 (or the second recess 221) will only remove the protecting layer 92c (as shown in FIG. 7). Furthermore, when the user inserts the cable 90 into the opening O and one end of the cable 90 has reached the retaining element 80 (as shown in FIG. 5B), the removed length of the outer layer 92 will be a fixed length. In other words, the retaining element 80 can indicate the removed lengths to help the user quickly remove a specific length of the outer layer 92.

Finally, when the cable 90 is stripped to be in the state shown in FIG. 7, the user can use the Velcro hook and loop strip 70 of the stripping tool 1 to separate a portion of the braid shield 92b of the cable 90 from the insulating layer 92a to expose a portion of the insulating layer 92a (as shown in FIG. 8).

As described above, the present invention provides a stripping tool 1 having a blade which can be changed through replacing the exchangeable tool holder 20, and the stripping tool 1 can remove outer layers 92 of at least two different cables 90 due to the exchangeable tool holder 20 having recesses of different dented depths, thereby facilitating the convenience and usability of the present invention. Furthermore, the user can operate the fixing member 40 of the stripping tool 1 by pushing it, which is labor saving and user-friendly.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A stripping tool for a user to strip at least one outer layer of a cable, with the stripping tool comprising:
   a body having a hole;
   an exchangeable tool holder disposed in the hole, wherein the exchangeable tool holder has a first side disposed with a first recess;
   at least one first blade connected with the exchangeable tool holder, with the at least one first blade having at least one portion protruded out of the first recess;
   a fixing member movably disposed in the body, wherein the fixing member comprises a recess portion and a pressing end, wherein the recess portion is located in the hole to correspond to the first recess and to form an opening along with the first recess, and wherein the pressing end is provided for the user to move the fixing member to adjust the size of the opening; and
   an elastic element connected with the fixing member to provide an elastic force to the fixing member, wherein the fixing member is driven by the elastic force to work with the at least one first blade to hold the cable when the cable is placed in the opening, and wherein said at least one portion of the least one first blade is positioned for stripping the at least one outer layer by rotation of the body when the cable is fixedly held in the opening to produce a circumferential cut on the at least one outer layer.

2. The stripping tool as claimed in claim 1, wherein the body further comprises a cavity for disposing the pressing end of the fixing member therein.

3. The stripping tool as claimed in claim 2, wherein the pressing end comprises an arc-shaped plane.

4. The stripping tool as claimed in claim 3, wherein the cavity comprises an inner wall having a concave surface corresponding to the arc-shaped plane to form a substantially circular through hole, which is provided for the user to rotate the body.

5. The stripping tool as claimed in claim 1, further comprising at least one second blade, wherein the exchangeable tool holder further comprises a second side disposed with a second recess, wherein the at least one second blade is connected with the exchangeable tool holder, and wherein the at least one second blade has at least one portion protruded out of the second recess.

6. The stripping tool as claimed in claim 5, wherein the first recess has a dented depth different from that of the second recess.

7. The stripping tool as claimed in claim 5, wherein two side walls of the hole are each disposed with a concave track respectively, wherein the exchangeable tool holder further comprises a third side and a fourth side corresponding to the third side, and wherein the third side and the fourth side are respectively disposed with a bump for engaging with each one of the two concave tracks respectively, thereby allowing the exchangeable tool holder to be detachably connected with the body.

8. The stripping tool as claimed in claim 1, further comprising a hook and loop strip connected with the body.

9. The stripping tool as claimed in claim 1, further comprising a retaining element connected with the exchangeable tool holder, wherein the retaining element stops one end of the cable when the one end of the cable goes through the opening and reaches the retaining element, thereby allowing the user to rotate the body to remove a fixed length of the at least one outer layer.

10. The stripping tool as claimed in claim 1, wherein the exchangeable tool holder is detachably connected with the body.

11. The stripping tool as claimed in claim 1, wherein the exchangeable tool holder is detachably connected with the fixing member.

* * * * *